United States Patent [19]
Trumbull

[11] Patent Number: 5,499,920
[45] Date of Patent: Mar. 19, 1996

[54] METHOD OF GENERATING AN EVENT SIMULATION

[75] Inventor: Douglas Trumbull, Southfield, Mass.

[73] Assignee: Ridefilm Corporation, South Lee, Mass.

[21] Appl. No.: 477,749

[22] Filed: Jun. 7, 1995

Related U.S. Application Data

[62] Division of Ser. No. 14,117, Feb. 5, 1993.

[51] Int. Cl.⁶ ................................................ G09B 9/04
[52] U.S. Cl. ........................... 434/69; 434/62; 434/29; 472/60
[58] Field of Search ................ 434/69, 62, 29, 434/30, 38, 40, 43, 44; 352/132; 472/59, 60, 61, 130

[56] References Cited

U.S. PATENT DOCUMENTS

| | | | |
|---|---|---|---|
| 838,137 | 12/1906 | Plummer | 472/60 |
| 1,789,680 | 1/1931 | Gwinnett . | |
| 3,233,508 | 2/1966 | Hemstreet | 88/24 |
| 3,542,934 | 11/1970 | Warhurst et al. . | |
| 3,577,655 | 5/1971 | Pancoe . | |
| 3,577,659 | 5/1971 | Kail . | |
| 4,113,223 | 9/1978 | Kakizaki | 248/430 |
| 4,303,236 | 12/1981 | Czarnecki | 272/18 |
| 4,343,610 | 8/1982 | Chou | 434/58 |
| 4,352,664 | 10/1982 | Morrison et al. | 434/44 X |
| 4,492,356 | 1/1985 | Taniguchi et al. | 248/346 |
| 4,576,577 | 3/1986 | Lam et al. | 434/58 |
| 4,634,384 | 1/1987 | Neves et al. | 434/44 |
| 4,641,255 | 2/1987 | Hohmann | 364/522 |
| 4,752,065 | 6/1988 | Trumbull et al. | 272/18 |
| 4,753,596 | 6/1988 | Hart et al. | 434/29 |
| 4,798,376 | 1/1989 | Trumbull et al. | 272/18 |
| 4,868,771 | 9/1989 | Quick et al. | 364/578 |
| 4,874,162 | 10/1989 | Trumbull et al. | 272/18 |
| 4,879,849 | 11/1989 | Hollingsworth, III et al. | 434/60 X |
| 4,978,299 | 12/1990 | Denne | 434/58 |
| 4,993,673 | 2/1991 | Hirose | 248/178 |
| 5,006,072 | 4/1991 | Letovsky et al. | 434/61 |
| 5,018,973 | 5/1991 | Alet et al. | 434/62 |
| 5,071,352 | 12/1991 | Denne | 434/29 |
| 5,109,952 | 5/1992 | Starks et al. | 182/63 |
| 5,242,306 | 9/1993 | Fisher | 434/44 |

FOREIGN PATENT DOCUMENTS

| | | | |
|---|---|---|---|
| 2677155 | 12/1992 | France | 434/62 |
| 90/03627 | 4/1990 | WIPO . | |

*Primary Examiner*—Gene Mancene
*Assistant Examiner*—Jeffrey A. Smith

[57] ABSTRACT

A simulator system for use in providing an event simulation to an occupant includes a motion base moveable only along three mutually orthogonal displacement axes by means of displaceable actuators. An audio-visual display mechanism is included for providing a sequence of audio and visual images to the occupant. A motion base controller generates actuator drive signals. A system controller provides the command signals to the motion base controller in synchronization with the presentation of the audio-visual images. The projected visual images including "foreground" and "background" portions. The system controller generates the motion base command signals such that the displacement of the motion base is synchronized to the onset of movement of the foreground image and the foreground image is constrained to move, relative to the occupant, only along the same three orthogonal axes as the motion base.

4 Claims, 8 Drawing Sheets

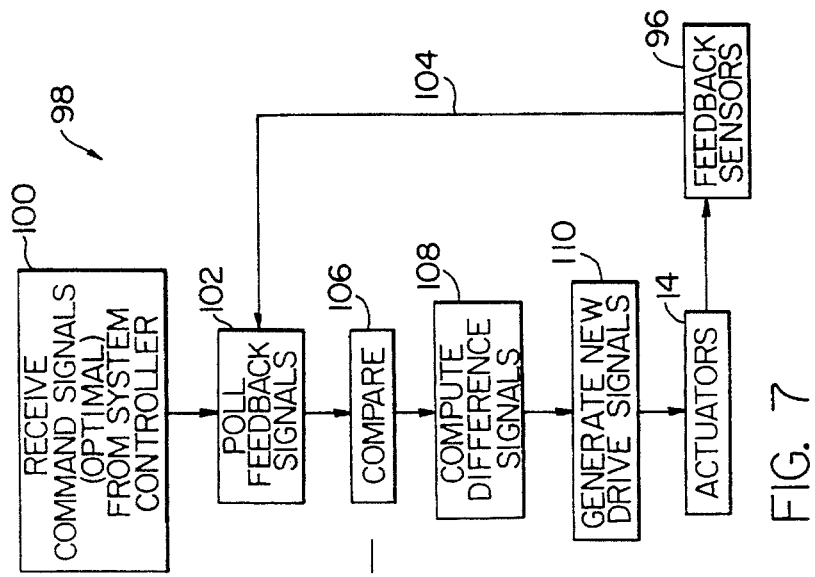
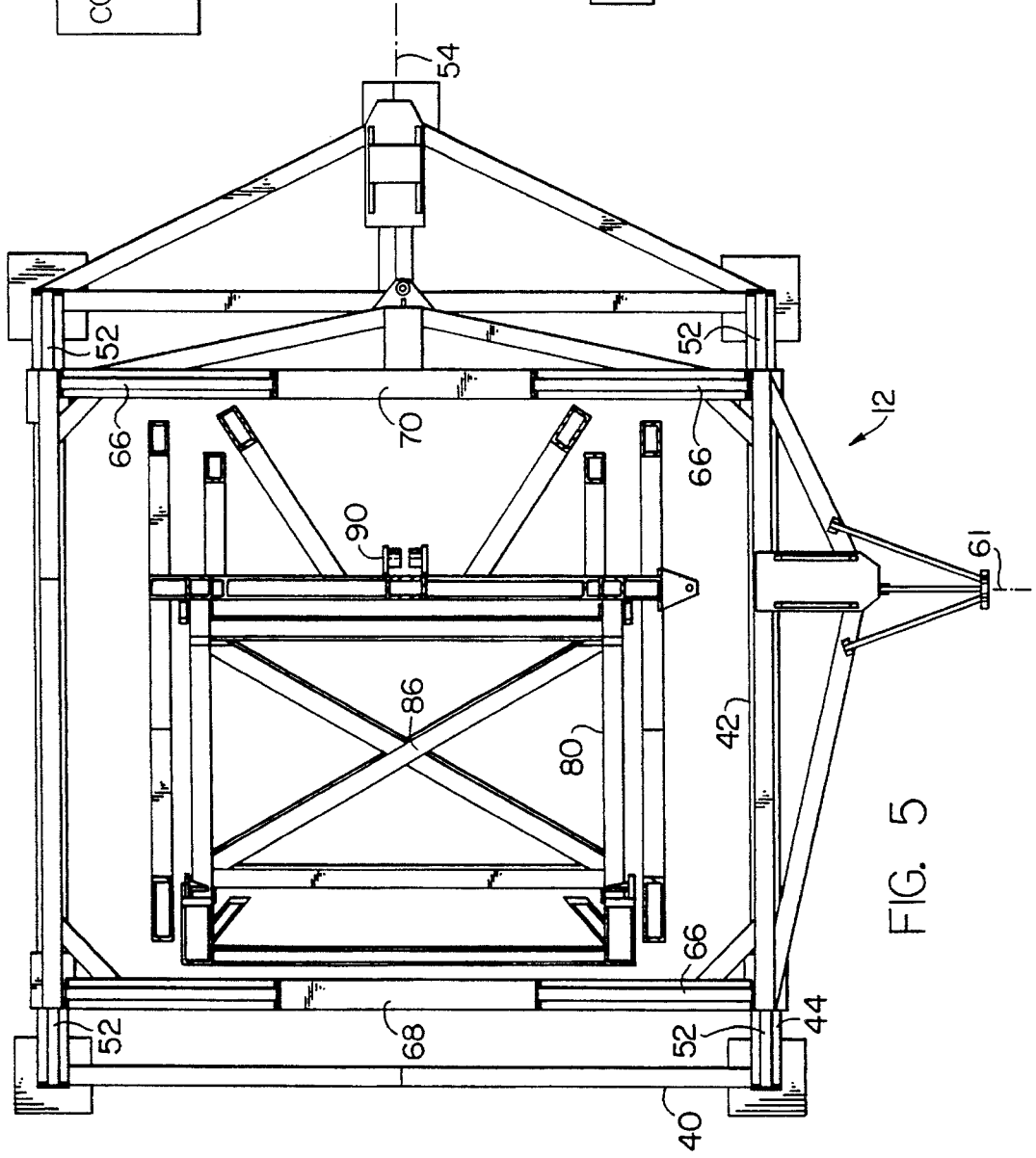
FIG. 5
FIG. 7

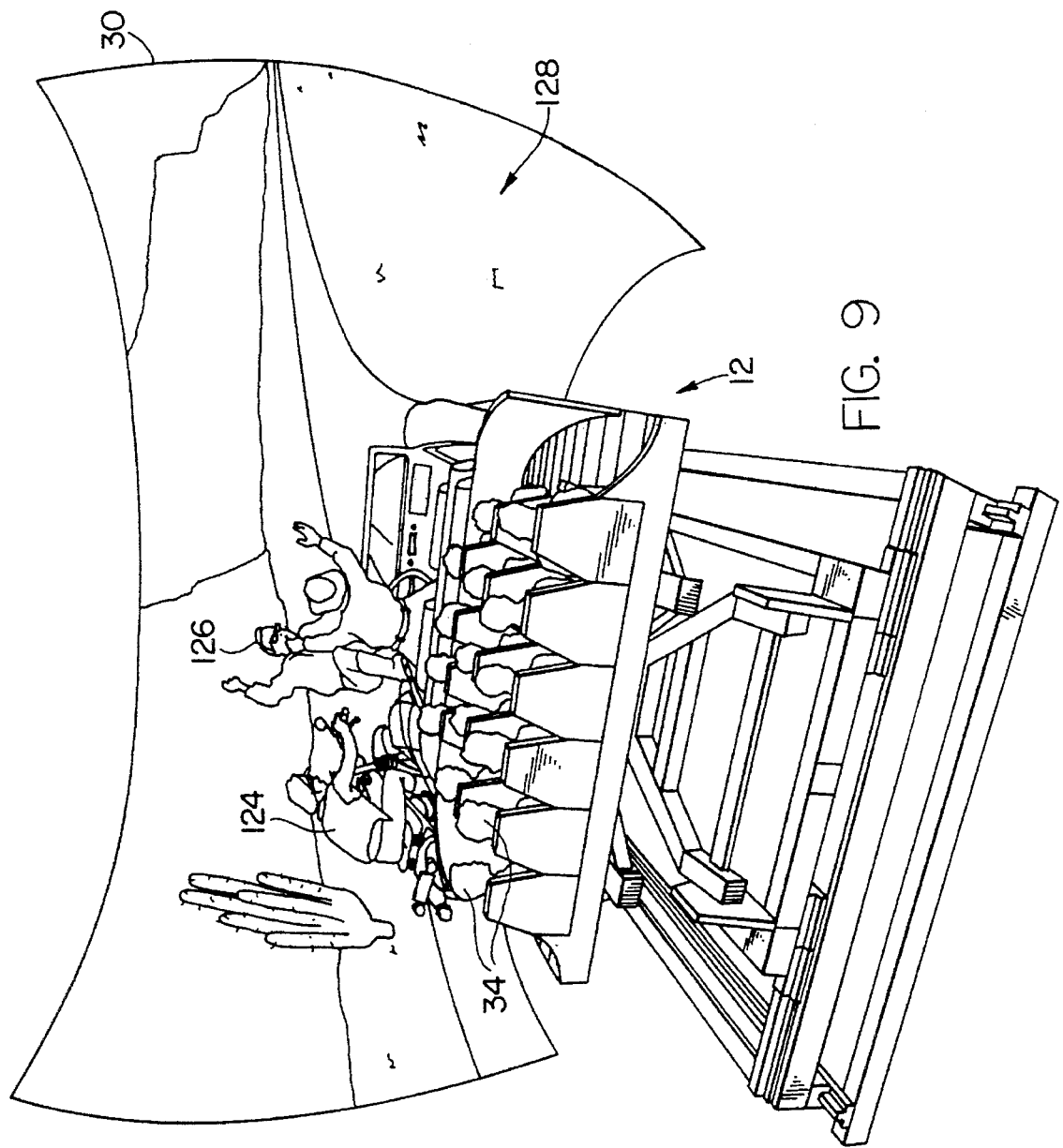

METHOD OF GENERATING AN EVENT SIMULATION

This is a divisional of co-pending application Ser. No. 08/014,117 filed on Feb. 5, 1993 (pending).

TECHNICAL FIELD

The present invention relates to simulators generally and in particular to simulator characterized by an orthogonal motion base.

CROSS REFERENCE TO RELATED APPLICATION

Some of the matter contained herein is disclosed and claimed in the commonly owned U.S. Pat. No. 5,199,875, entitled "A Method and Apparatus for Generating Supplemental Motion in a Simulator" and U.S. patent application Ser. No. 08/014,330 (U.S. Pat. No. 5,433,670), entitled "A Compact Simulator System Theater" both incorporated herein by reference.

BACKGROUND OF THE INVENTION

Simulators are well known in the art having found applications in such diverse fields as aircraft pilot training and amusement rides. In general, known simulators include a motion base having one or more seats and a plurality of programmable actuators which displace the motion base from a rest position in accordance with a predetermined sequence of drive signals. Synchronized with the motion base movement is a motion picture illuminated on a projection screen directly attached to the motion base or in the immediate environment. A controller is sometimes included to provide for the synchronization between the motion base displacements and the accompanying audio-visual work. Alternatively, the audio-visual images and motion base control signals are simultaneously recorded in media if, for example, the resultant program is to be repeatedly used.

Known simulators include the amusement ride apparatus disclosed in U.S. Pat. Nos. 4,752,065 and 4,798,376 which includes a motion base that moves and tilts passengers viewing a motion picture. A plurality of passenger holding frames is provided which are all synchronously moved by separate sets of actuators. A film is shown to passengers on a stationary screen. The passenger holding frames are each pivoted up and down on a beam which is supported only by two largely vertical actuators while two pairs of links or arms limit the movement of the beam.

U.S. Pat. Nos. 3,923,300 and 3,865,430 to Tanus disclose a theater chair that comprises a support structure and a chassis having a back, arms and a seat moveably affixed to the chassis. There is a provision for movement in the vertical and horizontal directions. The Tanus chair comprises part of a overall system wherein control signal information is coded on motion picture film. The chair is operated synchronously with the playing of the motion picture to enhance the realism of the movie.

An example of a game machine is provided by U.S. Pat. No. 4,478,407 to Manabe. The '407 machine includes a motion base wherein a seat is pivotally mounted at perpendicular hinge points on a planar platform with motion in a perpendicular third dimension being accomplished by actuators configured therewith. The '407 device is designed to generate roll pitch and yaw sensations, as well as vertical movement.

A motion system for flight simulation is disclosed in U.S. Pat. No. 3,645,011 to Callanen. The '011 flight simulation system includes three spaced-apart hydraulic actuators for imparting translation to respectively associated reciprocal pistons. One of the actuators is positioned in a vertical plane containing the longitudinal or roll axis of a grounded flight trainer and the other two actuators are spaced from the roll axis at vertical positions on either side transverse to that axis.

Another amusement ride is disclosed in U.S. Pat. No. 4,066,256. The '256 amusement ride creates the illusion that the passengers are seated in a rapidly maneuvering vehicle by applying forces to the passengers in synchronism with the display of a motion picture image. The '256 apparatus includes a passenger holding frame that has three locations resting on hydraulic rams that can tilt the frame or move it up and down with a film projector and viewing screen-connected to the frame to move with it.

U.S. Pat. No. 4,846,686 discloses a motor vehicle simulator with multiple images. The '686 simulator is characterized by a conventional front looking "driver point of view" image which would be seen by a driver looking through a windshield. Another section of the images displayed with the '686 simulator includes images that were recorded by one or more cameras which were facing rearward. An individual in the simulator is simultaneously presented with a forward looking "driver point of view" image and with other images representing what would be seen by the-driver looking towards the rear of the simulator vehicle.

U.S. Pat. No. 4,276,030 discloses a pivotable vehicle simulator with one end of an upper frame carrying an occupant station of a simulated vehicle. The upper frame is mounted to a base frame which is pivotal about a vertical axis. A dummy steering wheel is provided at the occupant's station and is linked to pivot the upper frame. Combined rotary and translation bearings support the other end of the upper frame on a shaft carried on a base frame to accommodate the pivotal movement about the vertical axis and also to provide a small upward pitching of the upper frame during pivoting of the upper frame in either direction from a central position so that gravity acts to restore the upper frame and steering wheel to centered conditions.

Other known simulator systems rely primarily on rotational motion including the amusement apparatus of U.S. Pat. No. 5,060,932, the video simulation apparatus of U.S. Pat. No. 4,856,771 and the simulation device of U.S. Pat. No. 4,710,129. All of the above are geared towards simulating simultaneous roll, yaw and pitch or combinations thereof. Some of the above are also configured to be used with projected images for viewing by occupants as part of the simulation. The amusement ride of U.S. Pat. No. 4,066,256 is characterized by three substantially vertical hinged actuators which are moved in a controlled manner to displace a suspended horizontal platform, thereby simulating acceleration in the plane of the platform.

With known simulators the movement imparted by the motion base has been correlated with the presentation of visual images without regard to the physiological effect on passengers of that combination of image and motion. An unanticipated and unwanted consequence has been the frequent inducement of motion sickness. It has been recognized that motion sickness stems primarily from an improper relationship between visual images and the corresponding motion of a person's reference frame.

Simulators deceive the mind through the use of a combination of visual images coupled with limited motion of the passengers. To be effective, simulators must rely on tricking the inner ear with initial movement of the motion base synchronized with the "onset queues" presented as part of the visual image. The inner ear is sensitive to acceleration, i.e., the rate of change of velocity per unit time. The magnitude of acceleration is greatest at the onset of motion or at the onset of a change in motion. Consequently, it is most important for there to be strict correlation between the onset of the movement of the motion base and the corresponding visual image.

Angular motion of the frame of reference has been specifically demonstrated to be of great importance in causing motion sickness. For example, the driver of a car is least susceptible to motion sickness as compared to its passengers. Driver visual input is almost exclusively the view down the road towards the horizon. As such, the driver's frame of reference undergoes only orthogonal, rectilinear movement. In contrast, the passenger's frame of reference includes the other passengers as well as the vehicle's interior. The heaving and bobbing of that frame while driving is characterized by angular motion (e.g., roll, pitch and yaw).

Simulators, therefore, should correlate the physical and visual onset queues and avoid angular movement of that which comprises the passengers frame of reference, such as the vehicle interior. However, in the prior art there has been no recognition of the need to maintain orthogonal fidelity between motion and the visual images associated therewith or correlate onset queues. No prior art motion base is configured to constrain motion only in three orthogonal directions. In contrast, the prior art is unanimous in extolling the virtues of maximizing the degrees of freedom of the motion base and provide for rotational or angular motion of the vehicle, (roll, pitch and yaw) as they are directed at or derived from flight simulation and are constructed without regard the relationship between onset queues.

Known motion bases must be adapted to emulate orthogonal motion, requiring additional complexity in the controller. The hardware needed to simulate rotational motion is superfluous if only three orthogonal degrees of freedom are mandated. Moreover, the cost of these prior art motion bases are correspondingly excessive when movement is so limited. It would be desirable to have a simulator system which generates a more realistic simulation of an event in a simple and cost efficient manner while avoiding movement that has the potential for inducing motion sickness. The present invention is drawn towards such a simulator system.

SUMMARY OF THE INVENTION

An object of the present invention is to provide a simulator system whose realism is enhanced by a motion base substantially limited to three linear orthogonal axes of motion.

Another object of the present invention is to provide a system of the forgoing type wherein correlation between visual and motion onset queues is maintained.

Another object of the present invention is to provide a simulator system of the foregoing type having an audio visual display synchronized with the movement of the motion base such that inappropriate angular movement in the visual display is avoided.

Still another object of the present invention is to provide a simulator system of the foregoing type displaying visual images having a subportion thereof whose elements are constrained to move only in orthogonal directions in concert with the motion base displacements.

Yet another object of the present invention is to provide a simulator system of the foregoing type whose visual images are comprised of foreground and background images with the foreground image elements constrained to orthogonal movement only.

Another object of the present invention is to provide a simulator system of the foregoing type wherein elements of the visual image can transit between the foreground and background image portions and have their actions restricted in accordance with selected rules of motion.

Still another aspect of the present invention is to provide a simulator system of the foregoing type whose passengers are each provided displacements of equal magnitude by the motion base.

According to the present invention, a motion base for use with a simulator system having a system controller that generates command signals for presentation of a sequence of audio-visual image signals to a simulator system occupant synchronously with the movement of the motion base includes a first member fixed to provide a foundation; a second member adapted to be received by the first member to be moveable relative thereto only in a first direction; a third member adapted to be received by the second member to be moveable relative to the second member only in a second direction orthogonal to the first direction. A platform is adapted to be received by the third member to be moveable relative to the third member only in a third direction orthogonal to both the first and second directions. The platform is adapted to receive ride simulation apparatus upon an upper platform surface. Also, a linear displacement apparatus is included with pairs of cooperatively engaging first and second guide elements affixed to adjacent ones of the members for constraining the members to linear movement relative to one another. A plurality of actuators is provided for effecting linear displacement of the members relative to one another in response to received actuator drive signals.

According to another aspect of the present invention, a simulator system for use in providing an event simulation to an occupant thereof includes a motion base moveable only along three orthogonal displacement axes and has a first member fixed to provide a foundation and a second member adapted to be received by the first member to be moveable relative thereto only in a first direction. A third member is adapted to be received by the second member to be moveable relative to the second member only in a second direction orthogonal to the first direction. A platform is adapted to be received by the third member to be moveable relative to the third member only in a third direction orthogonal to both the first and second directions. The platform is further adapted to receive ride simulation apparatus upon an upper platform surface. There is a linear displacement apparatus including pairs of cooperatively engaging first and second linear guide elements affixed to adjacent ones of the members for constraining the members to linear movement relative to one another. A plurality of actuators are provided for effecting linear displacement of the members relative to one another in response to received actuator drive signals. An audio-visual display means is included for providing a sequence of audio and visual image signals to the simulator system occupant. A motion base controller generates the actuator drive signals in response to received command signals and a system controller provides the command signals to the motion base controller in synchronization with the presentation of the audio-visual image signals.

BRIEF DESCRIPTION OF THE DRAWINGS

FIG. 5 is a section view of the motion base taken along line 5—5 of FIG. 4.

FIG. 7 is a diagrammatic illustration of an algorithm executed by the simulator system of FIG. 1.

FIG. 9 is another simplified illustration showing the relationship between the foreground and background portions of a projected image subsequent to that of FIG. 8.

DESCRIPTION OF THE PREFERRED EMBODIMENT

Figure 1:
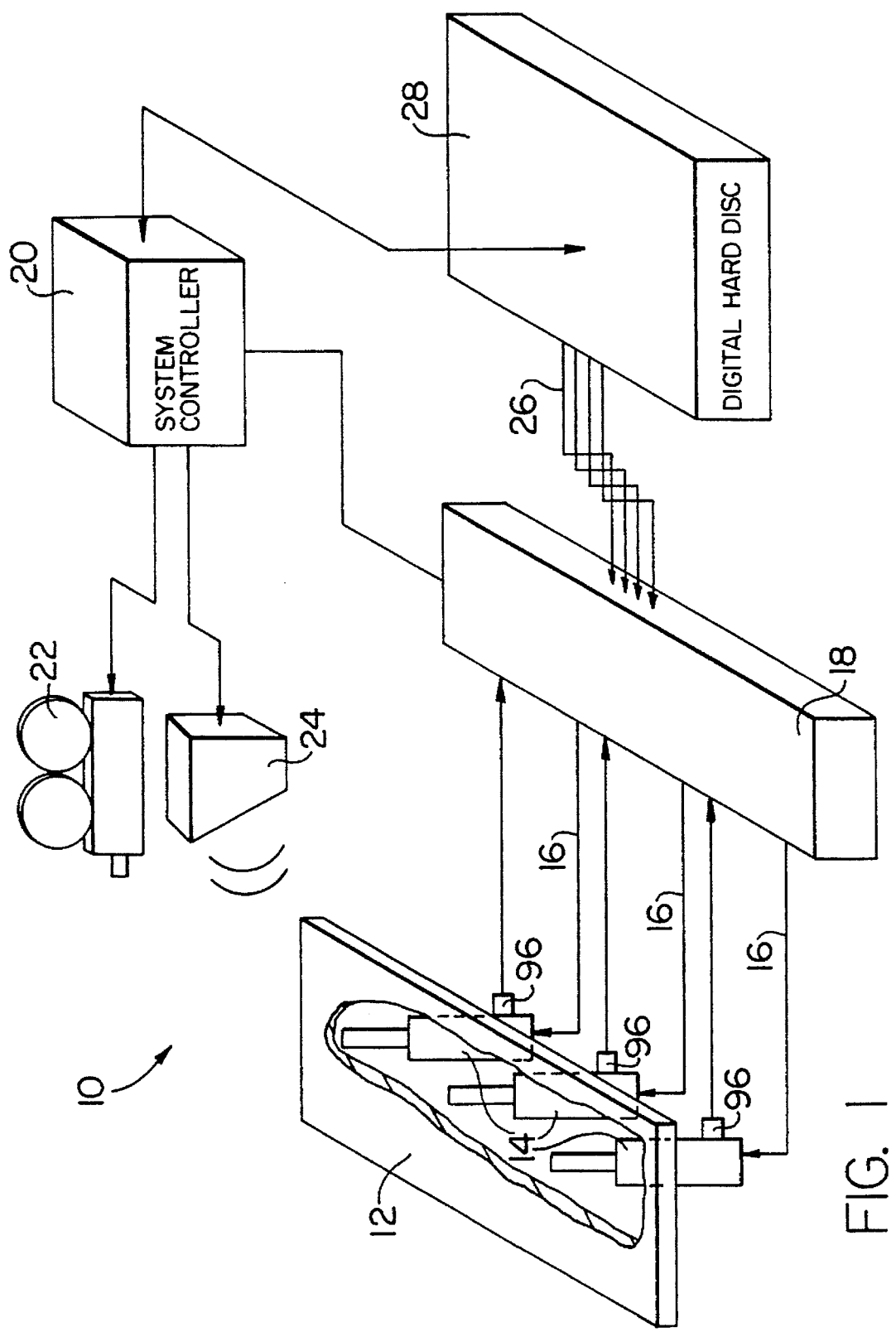
FIG. 1 is a simplified block diagram illustrating a simulator system provided according to the present invention.

Referring now to FIG. 1 there is shown a block diagram illustrating a simulator system 10 provided according to the present invention. The system 10 comprises a motion base 12 which includes a plurality of actuators 14. The actuators are of a known hydraulic type and receive drive signals on lines 16 from a motion base controller 18. The motion base includes at least one seat for a simulator system occupant.

The simulator system includes a system controller 20 that provides control signals to an audio-visual system indicated schematically by projector 22 and speaker 24 as well as a viewing screen, not shown in the Figure. Typically, the audio-visual images are encoded in a single film medium in a known manner. Command signals are provided on lines 26 from a storage medium such as a digital hard disc 28 to the motion base controller. The actuator drive signals are programmed in a manner detailed hereinafter and are configured to be synchronously applied to the motion base in accordance with the preprogrammed audio-visual images. As noted above, the motion base is preferably comprised of a plurality of hydraulic actuators each of which is respectively configured with a servo valve (not shown) for receiving drive signals to displace the actuators a selected amount at a selected rate. Both the hydraulic actuators and the servo valves are of a known type.

Figure 2:
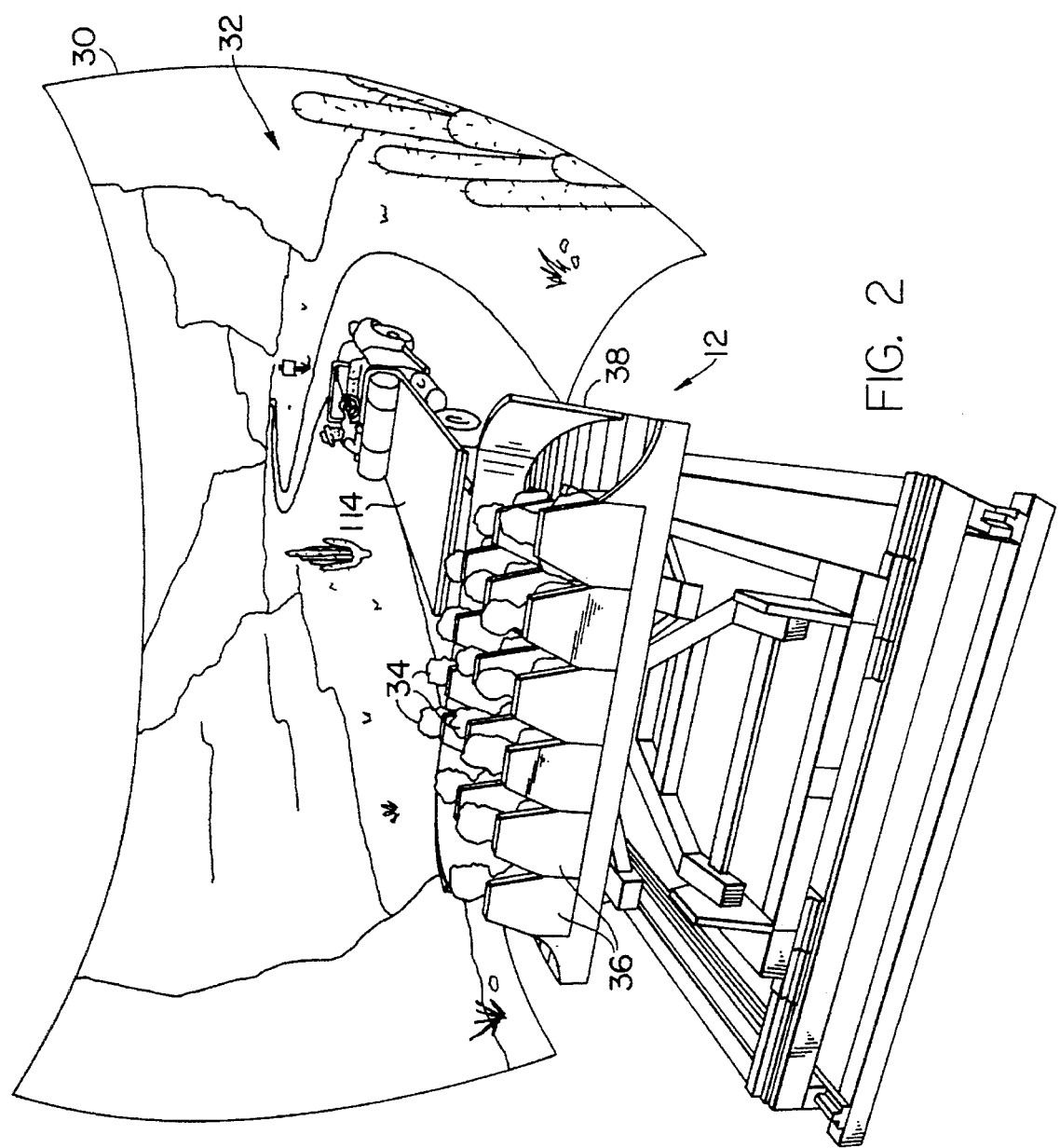
FIG. 2 is a simplified view in perspective of a portion of the simulator system of FIG. 1.
Figure 3:
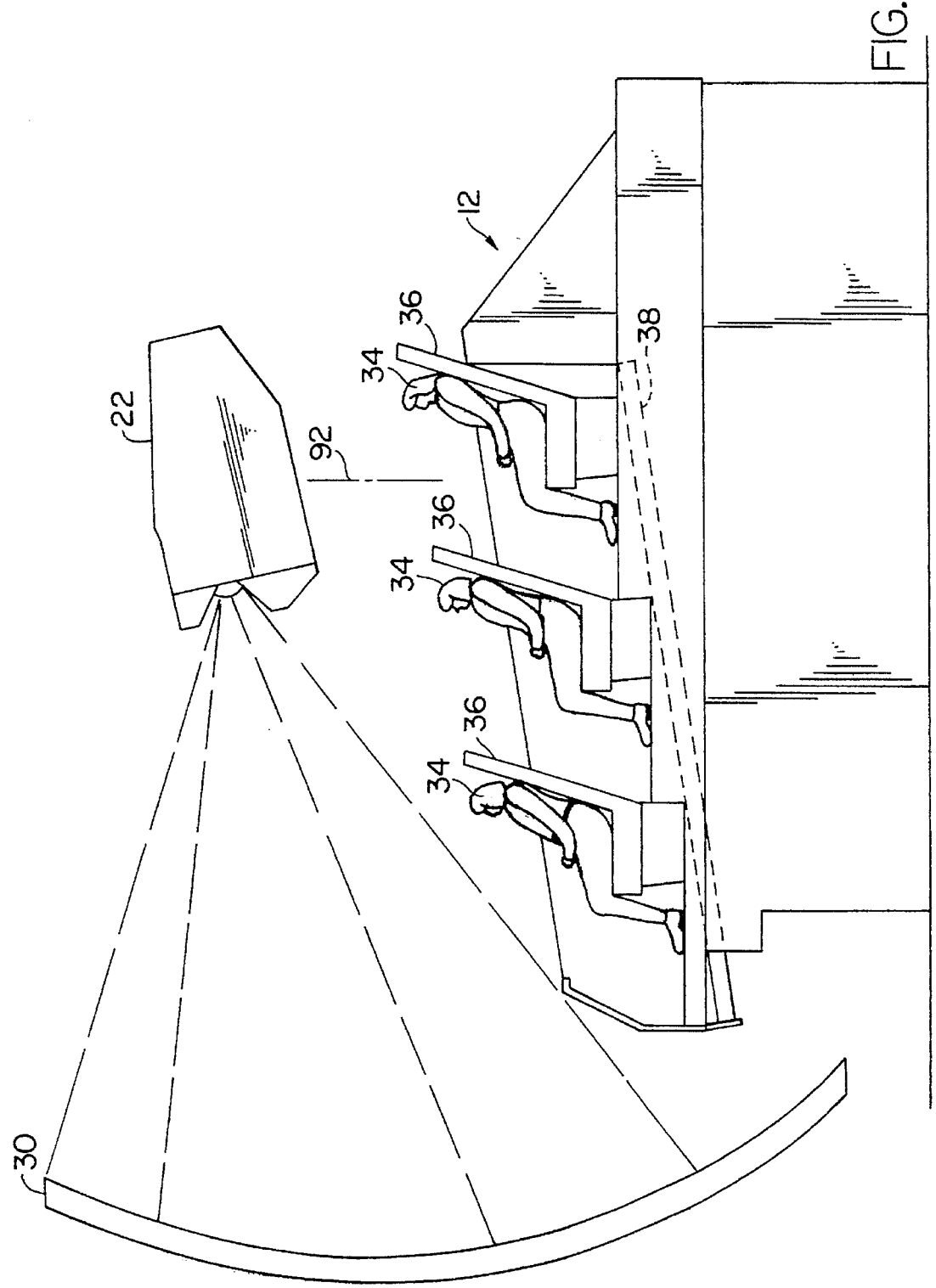
FIG. 3 is a simplified side elevational view of the simulator system of FIG. 1.

FIG. 2 is a simplified schematic illustration of a preferred embodiment of the system 10 including the orthogonal motion base 12. On screen 30 is projected an image 32 having two components which, as detailed hereinafter, obey separate rules in terms of allowed motion. The screen is curved, with the preferred geometry being spherical. There is no limitation as to the film format that can be used with the present invention. Passengers 34 are placed in seats 36 on a platform 38. The preferred system seats between 12 and 15 individuals. As shown in a side illustration of the motion base in FIG. 3, the platform is inclined towards the screen to afford each passenger an unobstructed view. Also shown in FIG. 3 is the projector 22 positioned above the motion base.

Figure 4:
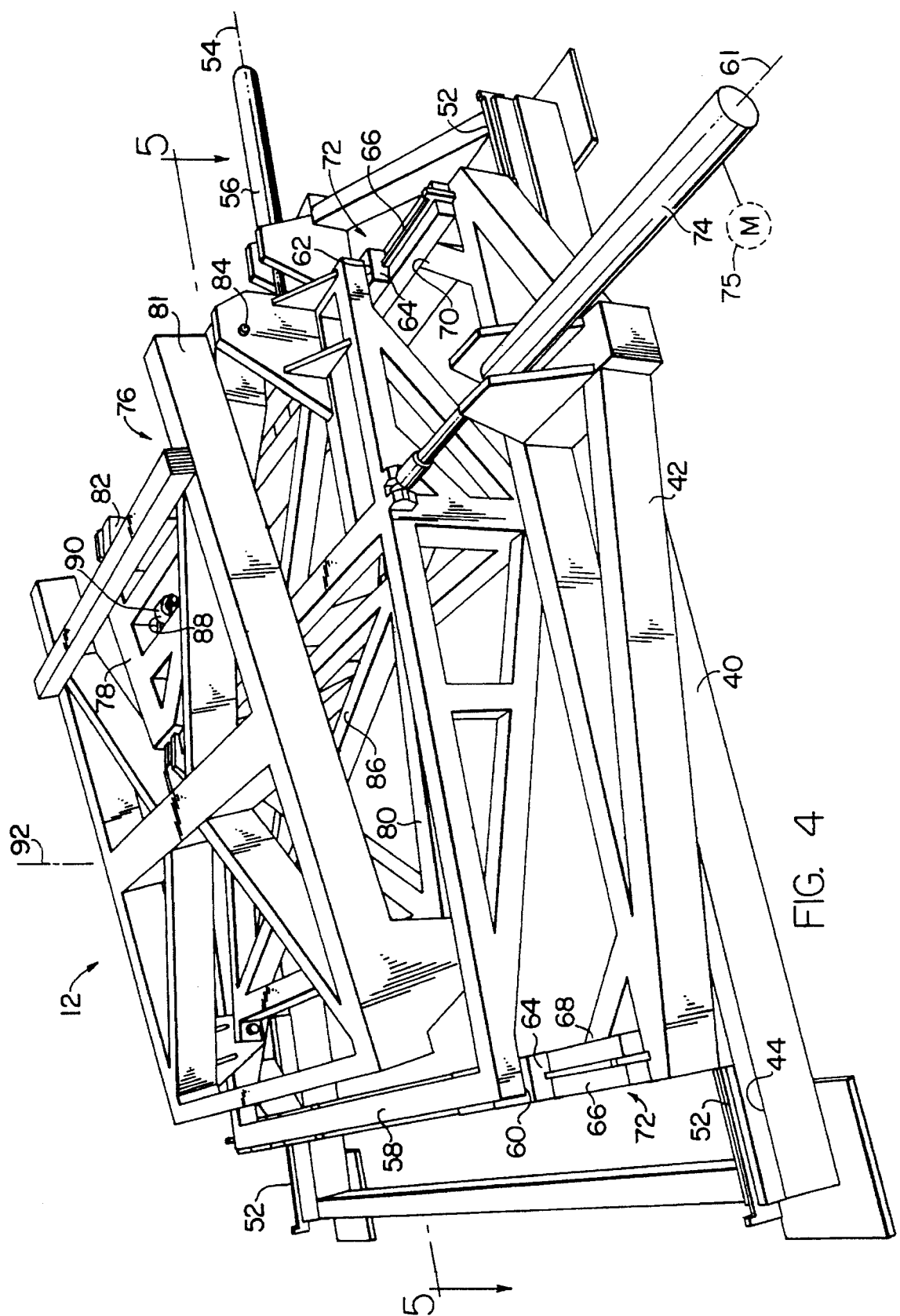
FIG. 4 is a perspective view of the motion base included in the simulator system of FIG. 1.
Figure 6:
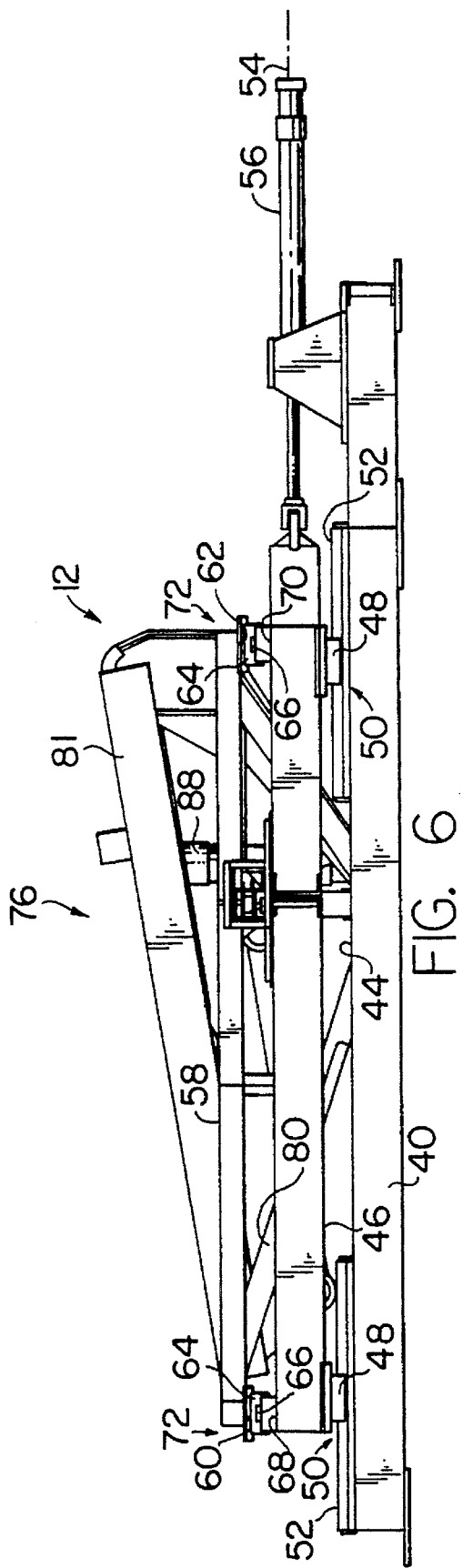
FIG. 6 is a simplified illustration of a side elevation view of the motion base of FIG. 4.

FIGS. 4–6 illustrate the assembly of the motion base 12 both in perspective and plan. A base frame 40 acts as a foundation for the motion base and is affixed to the floor or other immovable portion of the simulator system. A middle carriage 42 is located on a base frame upper surface 44. Along a bottom surface 46 of the middle carriage is a first member 48 of a first displacement mechanism 50 which comprises rails or tracks of a known design. A second member 52 cooperative with first member 48 is affixed to the upper surface 44 of the base frame. The middle carriage is configured to be moveable only along axis 54 by means of actuator 56.

Atop the middle carriage is an upper carriage 58 having bottom surfaces 60, 62 respectively having members 64. Cooperative rails 66 are affixed to respective upper surfaces 68, 70 of the middle carriage. Members 64 and rails 66 together comprise a second displacement mechanism 72 that constrains the upper carriage to movement only along a second axis 60 perpendicular to axis 54. Actuator 74 provides force needed to move the upper carriage as desired. Although the displacement mechanisms are shown to be cooperative rails, those skilled in the art will note that other, equivalent means may be substituted including track or rack and pinion mechanisms. Similarly, other means of actuation, such as electromagnetic motors 75 or pneumatic cylinders may be substituted with appropriate conventional modification to the system's hardware and software.

A motion platform 76, received by the upper carriage, is preferably tilted at an angle whose magnitude is in concert with a theater seat configuration. The motion platform comprises a lift arm 78 and stabilizer 80 that are pivotably mounted to a passenger frame 81 to form a parallelogram. The lift arm is "Y" shaped and is pivotably mounted to the upper carriage at hinge points 82, 84. The stabilizer is preferably a perimeter frame structure with a cross brace 86. The passenger frame receives the passenger platform. Provision is also made on the passenger platform 38 for receiving any auxiliary furniture or other equipment which would comprise the simulator.

Actuator 88 is received at lift arm apex 90. In the preferred embodiment, the actuator 88 is mounted vertically and urges the lift arm upward at the apex. The lift arm is configured with the stabilizer to limit the motion of the passenger platform 38 along a vertical axis 92. The preferred motion base is characterized by a reduced height as compared to the prior art and by orthogonal motion in the plane containing the upper and middle carriages, with substantially vertical motion (i.e. less than 10 degrees rotation) in the third direction. Those skilled in the art will note that other motion base configurations are encompassed by the present invention, including embodiments wherein the passenger platform is moved vertically by a rail or rack and pinion mechanism or by a cantilever mechanism.

The motion base of the preferred embodiment is simple and light-weight to reduce construction and maintenance costs. The motion base members are configured to move only along a respective single axis such that rotational motions along a yaw, pitch and roll rotational axes are almost completely avoided. Without rotational motion, the present motion base obviates the need for universal joints, hinges, swivel couplings and the like which are needed to accomplish complex angular positions as provided by conventional motion bases. The present motion base is limited almost entirely to only three degrees of freedom, the classic x, y and z orthogonal axes.

The motion base controller is preferably a proportional/integral/derivative (PID) type controller as is marketed by the Allen Bradley Corporation. The motion base controller generates actuator drive signals in response to command signals received from either the system controller or an external source such as a hard disc recorder 28 in the preferred embodiment. The motion base is preferably operated in closed loop fashion, with each actuator having a sensor 96 for generating feedback signals corresponding to the measured actuator displacement. These feedback signals are used by the motion base controller to insure a maximum error between the commanded position of the actuator and its actual displacement is not exceeded during operation. A value of about 80 Hz. has been selected as the actuator drive signal frequency upper bound as a safety feature to prevent that controller from attempting to operate the motion base in a manner which could cause unintended oscillations.

For a given set of audio-visual images or motion picture in the preferred embodiment, a corresponding sequence of command signals must be generated for the motion base controller in repetitive programming situations, such as in an amusement ride. Typically the command signals for the motion base controller are programmed using an Anitech motion controller manufactured by the Anitech Corporation. This controller comprises algorithms which allow for manual selection of individual actuator displacements synchronized with corresponding segments of the motion picture. In addition, algorithms such as executed by PCFX software provided by the Persistence of Vision Company, Culver City, Calif. are used to provide for specific desired transient responses of the motion base. The PCFX program or its equivalent provides for enhanced editing capabilities as well as command signal generation utilities for sine wave generation, actuator displacement smoothing and key frame splicing.

The motion base must have each programmed actuator position synchronized with the audio-visual images being presented to the occupants at a particular time. Synchronization can be accomplished in any of a number of ways. In the preferred embodiment, the SMPTE time code is provided to the system controller from the motion picture and is provided to controller software such as is available from the above-referenced Anitech Corporation and auxiliary control apparatus such as a Studio 3 sequence and a Macintosh brand computer or equivalent. Software associated with the system controller synchronizes the command signals with the associated motion picture frame(s). The Synchronized command signals are then preferably stored in the digital hard disc. The system controller also comprises software of a known type to enable synchronized playback of the command signals with the presentation of the motion picture to the occupants of the simulator system. For example, minimum acceleration is achieved when the command signal sequence is selected to approximate a Gaussian function. Similarly, other mathematical algorithms can be used to generate maximum acceleration. In the system 10 this is accomplished using the PCFX program noted above. The speed of displacement of the actuator is programmed in view of the motion base controller cutoff frequency.

FIG. 7 illustrates a simplified algorithm 98 executed by the present invention. Regardless of what kind of motion base controller provides the drive signals, one channel of drive signal voltage is provided to a servo valve on each axis which controls the amount of hydraulic pressure exerted by each actuator. These drive signals correspond to optimal actuator displacements as determined by the command signals (block 100). At periodic sample points, commonly 4 per frame or 192 samples per second in the present system operating at 48 frames per second, the motion base controller polls (block 102) the associated feedback signal 104 from feedback sensors 96 to determine the current displacement of that actuator. These signals are then compared to the commanded actuator displacement signals at block 106 and a difference is calculated (block 108). The result is either positive or negative and the actuator is then either extended or compressed in an effort to make the calculated error zero in response to new drive signals (block 110).

A further advantage of the present invention results from the simplification in the control system needed to operate the motion base. The algorithms needed to generate the three axis movement as described herein are necessarily more complicated with motion base systems with four or more degrees of freedom. The combination of less complex hardware and operational software yields a substantial savings in overall simulator system costs.

In the present invention therefore, the visual onset queue must be limited to the linear, orthogonal motion that characterizes the motion base. Prior art motion bases would violate this requirement, resulting in a lack of correlation between the visual and physical onset queues and a risk of motion sickness.

As noted hereinabove, the different effects of angular and orthogonal motion of a person's frame of reference on motion sickness has been established. The present simulator system, therefore, avoids angular motion of that which constitutes the frame of reference of the passengers. In some embodiments of the present invention the passengers frame of reference is established by the vehicle (e.g., auto or boat) in which the passengers are supposedly transported. Such embodiments would include a motion base as detailed above along with the vehicle interior surrounding the passengers. The movement of the interior of the car or prow of the boat would be automatically restricted to exclusively orthogonal motion since the interior is fixed to the motion base. The visual images presented in conjunction with the movements of the motion base are unrestricted, and include angular motion, linear orthogonal motion and/or combinations thereof.

However, that which comprises the frame of reference of the passengers can include a portion of the visual image presented to the passengers on the screen. In general, the visual image can be divided into an image subportion which comprises part of the passengers frame of reference and the remainder image. This feature of the present invention marks an important departure from the prior art and allows for new simulator systems heretofore not available.

Figure 8:
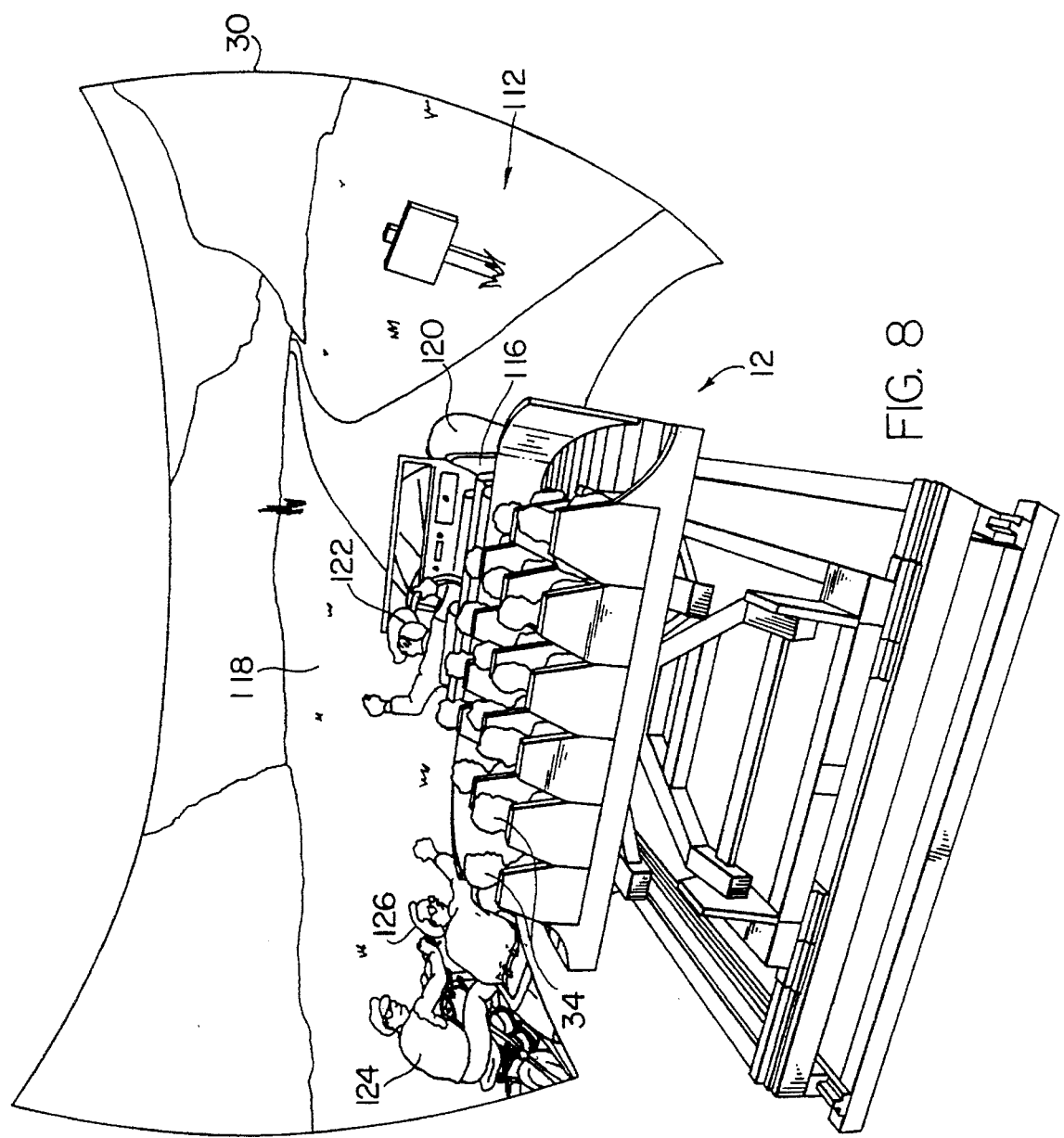
FIG. 8 is a simplified illustration showing the foreground and background portions of a projected image used with the simulator system of FIG. 1.

Referring now to FIG. 8 there is shown a simplified schematic illustration of a visual image 112 projected by the simulator system of the present invention. The image is projected on the screen for viewing by simulator passengers 34. In the preferred embodiment the visual image comprises a foreground image 116 with the remainder corresponding to background image 118.

The foreground and background images have different relationships with the simulator passengers. For example, the foreground image on the screen includes the automobile 120 as well as the driver 122. Since the foreground image is filmed in concert with the motion base, it is constrained to have only orthogonal motion. As noted above, angular motion of the foreground image relative to the occupants would induce an inappropriate relationship with the simulator passengers and possibly lead to motion sickness. Consequently, the driver and automobile will not undergo angular motion relative to the passengers. In contrast, the motorcyclists 124 and 126 comprise part of the background. This does not mean that the foreground image and its separate components undergo the same motion, nor does it means the passengers and foreground image move simultaneously. Rather, the constraint imposed by the present invention is only that the movement of the foreground image that comprises part of the frame of reference of the passengers be limited to orthogonal three axis motion.

The present simulator system has the capability to have live action in the foreground as part of the simulator passengers frame of reference. Moreover, visual elements of this foreground action can transit between foreground and background (and back again). Illustrated in FIG. 9 is a second image 128 provided with the present system that is shown subsequent to the image of FIG. 8. As depicted, the motorcyclist 126 climbs into the auto to fight the driver. Accordingly, the driver may be seen to transit from the foreground to the background during the fight sequence. Alternatively, the motorcyclist could be filmed to be part of the foreground while inside the auto. Thereafter, the motorcyclist (or driver) could leave the cab of the auto (voluntarily or forcibly) and become part of the background image. When part of the foreground image, a character is depicted in accordance with the rules governing foreground image motion such that only orthogonal movement is permitted. When part of the remainder background image, the character motion is unrestricted. Similarly, flatbed truck 114 of FIG. 2 is seen to "back" into the foreground image from the background.

To achieve this effect, the foreground image is photographed so that its physical relationship with the vehicle which it is associated remains fixed together. In this way the foreground image will remain in correct relationship with the motion base at all times. Alternative embodiments may have a portion of the background (i.e. horizon) also comprise part of the passenger frame of reference.

The present orthogonal motion base may also be scaled in size without effecting the magnitude of the displacement each passenger experiences. This feature is a direct result of the linear orthogonal motion to which the present motion base is constrained. In contrast, prior art simulators have an upper bound on size, and hence the number of passengers. This constraint stems from the fact that angular motion is allowed.

Angular motion entails rotations, usually about an axis and rarely about a point. Regardless, as the linear distance from the pivot increases, so does the magnitude of displacement and acceleration on the passengers. Consequently, those at or immediately about the pivot will have a reduced experience, while those furthest removed may be so displaced as to be quite uncomfortable. The only acceptable solution in the prior art is to limit the size of the simulator accordingly.

Similarly, although the invention has been shown and described with respect to a preferred embodiment thereof, it would be understood by those skilled in the art that other various changes, omissions and additions thereto maybe made without departing from the spirit and scope of the present invention.

I claim:

1. A method of generating an event simulation for a simulator including a moveable motion base having a platform for receiving an occupant, said motion base further having displaceable actuators for moving said motion base only along three orthogonal axes in accordance with received actuator drive signals, said method comprising the steps of:

generating a sequence of audio signals to be received by said occupant by means of an audio-visual display means;

generating a sequence of background visual image signals to be received by said occupant by means of said audio-visual display means;

generating a sequence of foreground visual image signals to be received by said occupant by means of said audio-visual display means such that said foreground image is constrained to move only along said three orthogonal axes; and synchronizing said actuator drive signals with said foreground visual image signals along with said background visual image signals and said audio signals.

2. The method of claim 1 wherein said base further comprises a feedback sensor configured with each of said actuators and said method further comprises the steps of:

generating feedback signals indicative of the measured displacement of a corresponding one of said actuators to a motion base controller; and combining said feedback signals with said actuator drive signals.

3. A method of generating an event simulation for a simulator including a moveable motion base having a platform for receiving an occupant, said motion base further having displaceable actuators for moving said motion base only along three orthogonal axes in accordance with received actuator drive signals, said method comprising the steps of:

generating a sequence of audio signals to be received by said occupant;

generating a sequence of visual image signals to be received by said occupant, said visual image signals having a sub-set thereof comprising a visual frame of reference for said occupant;

generating a sequence of said visual image subset signals to be received by said occupant such that said subset image is constrained to move only along said three orthogonal axes;

generating a sequence of said actuator drive signals; and synchronizing the presentation of said actuator drive signals with said visual image subset signals and with the remainder of said visual image signals and said audio signals.

4. The method of claim 3 wherein said visual image signals further comprise a visual element and wherein said visual image subset generating step further comprises the steps of transmitting said visual image element between said visual image subset signals and the remainder of said visual image signals.

* * * * *